United States Patent [19]
Margolis

[11] Patent Number: 5,584,236
[45] Date of Patent: Dec. 17, 1996

[54] FAT REMOVAL DRAINING SYSTEM AND METHOD

[76] Inventor: Geoffrey Margolis, 12229 Falkirk La., Los Angeles, Calif. 90049

[21] Appl. No.: 303,321

[22] Filed: Sep. 9, 1994

[51] Int. Cl.⁶ .............................. A23B 5/00; A23N 1/00; A47J 43/14
[52] U.S. Cl. .................. 99/425; 99/444; 99/495; 210/348; 210/248; 210/464; 210/455
[58] Field of Search .................. 99/400, 408, 425, 99/444, 446, 495, 352; 210/348, 464, 455, 248

[56] References Cited

U.S. PATENT DOCUMENTS

| | | |
|---|---|---|
| 452,213 | 5/1891 | Castanos et al. . |
| 754,310 | 3/1904 | Horine ............... 99/422 |
| 1,620,567 | 3/1927 | Navarre . |
| 1,656,662 | 1/1928 | Carter et al. . |
| 3,125,019 | 3/1964 | Ackerman . |
| 3,177,080 | 4/1965 | Alberts . |
| 3,457,853 | 7/1969 | Morley . |
| 3,603,240 | 9/1971 | McCarthy . |
| 3,682,655 | 8/1972 | Touba . |
| 3,739,712 | 6/1973 | Duning . |
| 3,802,635 | 4/1974 | Drisschel . |
| 3,818,824 | 6/1974 | Kloda et al. . |
| 3,949,659 | 4/1976 | Hunt . |
| 3,965,807 | 6/1976 | Baker . |
| 4,346,653 | 8/1982 | Rodak . |
| 4,352,324 | 10/1982 | Noh ............... 99/425 |
| 4,601,237 | 7/1986 | Harter et al. . |
| 4,667,589 | 5/1987 | Bishop . |
| 4,846,054 | 7/1989 | Mange et al. . |
| 4,847,099 | 7/1989 | Elinsky . |
| 4,948,607 | 8/1990 | Margolis . |
| 4,980,185 | 12/1990 | Small . |
| 5,082,678 | 1/1992 | Margolis . |
| 5,116,633 | 5/1992 | Small . |
| 5,167,977 | 12/1992 | Gamay . |
| 5,168,800 | 12/1992 | Margolis . |
| 5,189,946 | 3/1993 | Leon ............... 99/403 |

FOREIGN PATENT DOCUMENTS

| | | |
|---|---|---|
| 770153 | 10/1967 | Canada . |
| 2440721 | 7/1980 | France ............... 99/425 |

*Primary Examiner*—David Scherbel
*Assistant Examiner*—Reginald L. Alexander
*Attorney, Agent, or Firm*—Loeb & Loeb LLP

[57] ABSTRACT

A device for fat removal from cooked meat product that employs a draining apparatus in a cooking vessel or container. The draining apparatus includes a draining slot array, a draining box, a draining tube and a controller element. Fat and excess liquids, which are liberated during cooking, are drained out of the container through the draining slots, and into the draining box and draining tubes.

10 Claims, 9 Drawing Sheets

FAT REMOVAL DRAINING SYSTEM AND METHOD

FIELD OF THE INVENTION

This invention relates to apparatuses and methods for removing fat from a cooked ground meat product and, in particular embodiments, to such apparatuses and methods which remove fat economically, while maintaining desirable texture and taste characteristics.

BACKGROUND OF THE INVENTION

In recent years, public concern regarding diet, in particular, fat intake, has dramatically increased. The focus on fat intake is particularly important as it has been found to relate to heart disease and other ailments, which are believed to afflict a large percentage of individuals throughout the world.

Blood cholesterol levels have been recognized as a major factor in determining whether an individual will suffer from heart disease. A major factor contributing to a relatively high blood cholesterol level is a high dietary intake of saturated fats.

The American Heart Association ("AHA") has recommended that, to reduce the risk of heart disease and cancer, individuals should reduce their daily dietary intake of fats and cholesterol. Specifically, the AHA has recommended (1) that individuals receive only 30% of their daily caloric intake from fat with only 10% of that amount being derived from saturated fat, and (2) that dietary cholesterol intake be kept below 300 milligrams per day.

To aid individuals in achieving these AHA recommendations, many consumer products, such as low fat cookbooks and low fat foods, are currently on the market. Nonetheless, many individuals avail themselves of the conveniences gained by eating in restaurants or ordering food from take-out restaurants. Unfortunately, many foods served in some of these establishments are relatively high in fat, due to the use of high fat meats.

The restaurant and food processing industry is aware of the growing public dietary conscience. Indeed, many restaurants have begun to offer low fat products on their menus. However, there is a concern that the removal of fat will adversely affect the taste of the food product and/or will add costly steps to food processing system.

Several approaches have been utilized in attempts to produce low fat meat products. One approach is to simply use low fat meat as a starting material. However, low fat meat can be relatively expensive. Further, low fat meats tend to be less "juicy" and less tasty because of the lack of fat present when cooking the meat.

Another approach is to reduce the fat in meat of relatively high fat content by cooking the meat and separating the fat rendered in the cooking process. This approach, unfortunately, also suffers from various problems. In particular, separating the fat from the meat is extremely difficult and expensive on a large industrial scale because cooked meat forms an interwoven matrix that holds the rendered fat, making draining difficult as well as time consuming. Further, even if separation of the fat can be achieved, this approach results in a low yield weight of low fat meat, since much of the initial raw meat weight is lost in the fat removal step. This increases the cost of the processed meat.

Various attempts at removing fat content from meats have been explored. For instance, in an industrial scale operation, U.S. Pat. No. 3,949,659 to Hunt describes a cooking vessel (or kettle) 13 provided with a number of relatively complex mechanisms for separating liquified fat from cooked meat. The kettle 13 described by Hunt operates with a "separation device" 48 (FIG. 3 of the Hunt patent) composed of a perforated pan 50 having a downward extending sidewall portion 52 and bottom portion 53. A support structure composed of rods 54, a threaded shaft 56, a cross support 60 and clamps 61 allow the pan 50 to be positioned within the kettle and rotated so as to draw the pan further into or outward of the kettle interior.

Hunt's separation device 48 is placed in the kettle and pressed downward onto the meat, after the meat is cooked, so as to draw the liquified fat through the pan, while maintaining the cooked meat below the pan (see FIG. 6 of the Hunt patent). This requires additional post cooking processing steps of removing the cooking agitator mechanism 29 and installing the separation device 48 onto the kettle. Furthermore, the kettle 13 is provided with either a tilting support for pouring out the separated liquified fat (FIG. 8 of the Hunt patent) or a pump mechanism for pumping out the separated liquified fat (FIG. 7 of the Hunt patent), requiring yet further processing steps and equipment.

U.S. Pat. No. 4,847,099 to Elinsky is directed to another apparatus and method for defatting and cooking meats, wherein the meat is suspended above boiling water and exposed to steam. During cooking the fat from the meat drips off into the boiling water. However, this process and apparatus may not be suitable for many industrial scale operations.

The inventor of the present invention has proposed other fat removing techniques. For example, U.S. Pat. No. 4,948,607 to Margolis describes a method and apparatus for removing fat from a preformed meat patty by applying pressure to a cooked patty sufficient to exude a substantial portion of liquified fat from the product.

U.S. Pat. Nos. 4,980,185 and 5,116,633 to Small are directed to a further method for making meat products having a reduced saturated fat and cholesterol content. Heated unsaturated oil is added to raw meat. The heated unsaturated oil acts as an extracting agent for cholesterol. Further, due to the heated oil, fats in the meat melt and become soluble. The heated oil containing the cholesterol and fat is separated from the meat with a heated aqueous fluid. According to these patents, fat content is reduced from 20.8% to 18.5% and cholesterol is reduced from 115 mg to 80 mg of cholesterol per 100 g of beef.

Thus, several different processes and apparatuses have been proposed for reducing the fat content in a cooked meat product. However, typical known processes can be relatively expensive and time consuming and/or require relatively complex equipment and process steps. Further, various prior art processes can adversely affect the texture and taste of the product. Moreover, the amount of fat removal provided by these processes either tends to be insufficient or tends to cause a significant reduction in the overall product yield. Thus, there is a need in the industry for an improved system of removing fat from a food product that minimizes adverse affects on the texture and taste of the product, that is relatively simple and cost effective and that does not significantly reduce (or reduce at all) the overall product yield.

SUMMARY OF THE DISCLOSURE

An object of preferred embodiments of the present invention is to provide a method and apparatus for reducing the fat content in a meat product, preferably to 10% by weight or less. A further object of preferred embodiments of the present invention is to provide a method and apparatus for producing a meat product with reduced fat content, in an economical manner, that has a taste and texture acceptable to consumers. These and other objects will be apparent from the description below.

According to a preferred embodiment of the present invention, the method and apparatus for removing fat from a food product, such as cooked ground meat, involves cooking meat in a container so as to liquify fat in the meat to form a liquid phase, separating in situ the liquid phase from the cooked meat by draining the liquid phase directly from the same cooking container and adding flavoring and water absorbent to the cooked, drained meat. To separate the liquid phase from the cooked ground meat, one preferred embodiment employs a draining system that removes the liquid phase from the meat through slots which are selectively opened during or after cooking the meat.

An example draining system comprises a draining box having a draining slot array and a plate and arm component within the draining box designed so as to cause the slot array to be opened or closed while the draining system is located on the cooking vessel. The plate and arm component has a plate supporting protrusions and an arm that is connected to a controller element. The plate is moved between first and second positions within the draining box via the action of the controller element on the arm. The protrusions on the plate coincide with the slot array such that the protrusions mate with the slot array when the plate is moved from the first (open slot) position, to the second (closed slot) position.

In a preferred embodiment, the addition of water absorbent and water or broth after the separation of the liquid phase substantially increases the overall yield of the resulting meat product. This method and apparatus, according to preferred embodiments of the present invention, produce a meat product with a fat content of 10% by weight or less. Moreover, the present invention may be implemented with minimum modifications to existing meat cookers. Other embodiments within the scope of this invention include meat cookers designed with integral draining systems.

BRIEF DESCRIPTION OF THE DRAWINGS

FIG. 2b is a front view of the meat cooker of FIG. 2a.

FIG. 2c is a top perspective view of the meat cooker of FIG. 2a.

DETAILED DESCRIPTION OF THE PREFERRED EMBODIMENT

It is well known that the cooking of raw ground meat typically produces a mixture of solid "chunky" cooked ground meat and a liquid phase consisting of liquified fat, and water-based broth formed during the denaturization (cooking) of the meat proteins.

It has been found (see Example 1) that, after separation of the liquid phase, the cooked ground meat is relatively low in fat content, irrespective of the initial fat content of the raw ground meat—i.e. the cooked ground meat typically contains only about 8 grams of fat for every 100 grams of raw meat cooked.

Thus, according to this principle, low fat (10 to 12% by weight fat) cooked ground meat can be produced from any percent fat raw meat, and in particular, from relatively inexpensive high fat (~25% by weight) raw meat—provided, of course, that the rendered liquid phase can be separated from the cooked meat. However, many cooking environments do not accommodate traditional liquid phase separation processes well, if at all.

At the small "kitchen" scale, separation of the liquid phase is easily achieved due to the relatively small quantity of meat (1 to 2 lbs.) that is generally cooked in a skillet of relatively large heated surface area (~100 inches squared). Thus, when the meat is distributed over the heated surface, it has an average bed depth of generally substantially less than about 1 inch. This thin bed of meat cooks quickly (in 5 to 10 minutes) and allows the rendered fat to easily drain to the skillet surface. Nevertheless, physical separation of the fat from the meat still necessitates transferring the meat/fat mixture to a screening device, with sufficiently small openings such that the fat can be separated from the meat.

On the other hand, at industrial scale, relatively large quantities (500 to 4000 lbs.) of raw ground meat need to be efficiently cooked in less than about 60 minutes per batch. This is generally achieved by processing meat in either horizontal or vertical cookers fitted internally with various types of agitator ribbons or blades.

These agitators are specifically designed to continuously circulate meat from the central region of the cooker to its outer heated walls and then back to the central region. By using this design approach, the heated surface area of the cooker is brought into frequent and rapid contact with the entire meat mass, thus permitting the meat to be rapidly cooked. In this manner, a much smaller heated surface area to meat volume ratio (ranging from 1 to 3 $ft^{-1}$) than the so-called "kitchen" scale operation (with a surface to volume ratio ranging from 20 to 40 $ft^{-1}$) can be used to cook large quantities of meat. For purposes of illustration, some example dimensions for typical "kitchen" scale and "industrial" scale operations are shown in Table 1 below.

TABLE 1

Surface to volume ratios of typical "Industrial Scale" cookers as compared to "Kitchen Scale" cookers

| | PROCESS AND MEAT QUANTITY COOKED | Approx. Major Dimensions of Processor | | | Heated Surface Area ft² "A" | Meat Volume* Ft³ "V" | A/V ft⁻¹ |
|---|---|---|---|---|---|---|---|
| | | Length ft. | Width ft. | Meat bed depth ft | | | |
| 1 | "Kitchen" Operation | | | | | | |
| | 1 lb meat | 0.8 | 0.8 | <0.08 | 0.64 | 0.016 | 40 |
| | 2 lb meat | 0.8 | 0.8 | <0.08 | 0.64 | 0.032 | 20 |
| 2 | "Industrial" Scale Operation | | | | | | |
| | 450 lb meat | 4.0 | 2.5 | ~1.0 | 18** | 7 | 2.6 |
| | 2500 lb meat | 7.0 | ~3.5 | ~1.25 | 42** | 40 | 1.0 |
| | 4000 lb meat | 11.0 | ~4.0 | ~1.75 | 82** | 65 | 1.3 |

*Calculated from meat quantity cooked and density of raw meat (~67 lb/ft³)
**Estimated from approximate shape of processor.

Many large scale industrial cookers are of the horizontal type, with heated outer walls and motor driven horizontal ribbon blender type agitators traversing the entire length of the cooker. The cookers are very compact in size, due to the use of small heated surface area to meat volume ratios. For example, the horizontal Blentech VersaTherm (Trademark) blending cooker Model TP - 28133 (manufactured by Blentech Corp., Rohnert Park, Calif.) can cook approximately 4000 to 5000 lbs. of raw ground meat in less than 60 minutes, yet is only 11 ft. long and approximately 4 ft. wide by 4 ft. deep.

The compact design of industrial cookers has major economic advantages, but unfortunately the small surface to volume ratio of these cookers result in dramatic increases (to about 2 feet) in meat bed depth causing significant limitations with regard to fat separation.

Thus, in contrast to the "kitchen" scale operation where both cooking and fat separation may be easily achieved, industrial scale cookers are typically designed for efficient cooking but not for ease of fat separation. Embodiments of the present invention employ the above discussed principles of separating the liquid phase from a cooked ground meat product to produce relatively low fat cooked ground meat, preferably on the industrial scale.

Embodiments of the present invention relates to a method and apparatus for removing fat from a food product, such as cooked ground meat commonly used in tacos and other similar foods. Further embodiments of the present invention are particularly well suited for use with various conventional industrial meat cookers. Yet further embodiments of the present invention comprise meat cooking systems which themselves comprise integral fat draining equipment.

The fat separation method of preferred embodiments of the present invention is based upon the concept that it is possible to construct or add drainage openings to a cooking vessel such that these openings will remain open and not contaminated with meat, thus permitting in situ draining of liquid fat from a cooked meat/liquid fat mixture produced in the cooking vessel. In this manner, separation is possible without the major processing complications of either transferring the cooked meat/liquid mixture to some external separating device (such as a screen) or the necessity to use or place further processing devices within the cooking vessel.

Further, according to preferred embodiments of the present invention, the draining method is effective even in large scale cookers where the meat bed depths can be in excess of 2 feet in length. In order to achieve such performance, it is necessary that the drain opening area is available throughout the draining period. This is achieved by closing the draining openings during the early phases of the cooking step so as to prevent plugging and contamination of the openings by meat while the meat is still in a raw and pliable physical state.

Despite the relatively large cooked meat bed depth found in industrial cookers, the draining method of preferred embodiments of the present invention requires a surprisingly small open draining flow area to permit a relatively rapid separation of the liquid fat and broth from the cooked meat. Thus, for example, with the openings being less than about 3/32 to 1/8 of an inch in width and the open flow area being greater than about 0.1 inch squared per pound of meat processed, it is possible to conclude in situ draining of the liquid fat and broth associated with cooked meat in a period of approximately 30 minutes or less. As a result, a particular advantage of various preferred embodiments of the present invention is that it permits current cookers to be relatively easily adapted to the manufacture of low fat ground meat.

Figure 1:
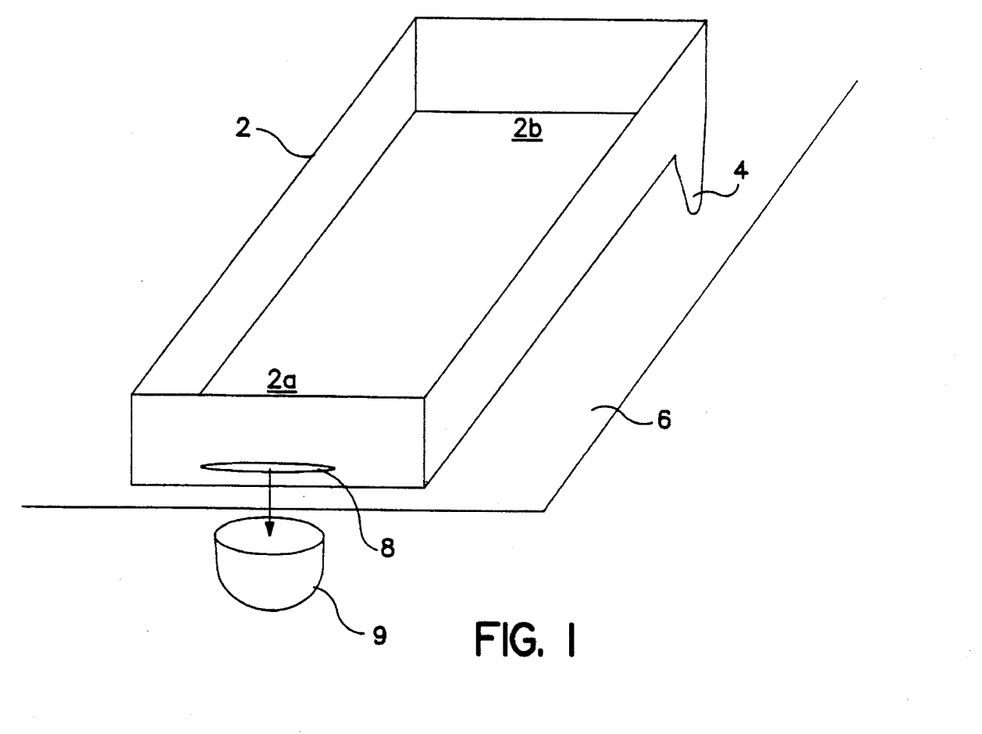
FIG. 1 is a perspective view of a meat cooker and drainer.

In "kitchen" scale operations, the cooking equipment may be provided with draining apparatus of relatively simple construction. For example, FIG. 1 depicts a cooking and draining apparatus which may be suitable for some smaller scale (e.g., "kitchen" scale) operations. The apparatus is of relatively simple construction and comprises a pan 2 having side walls and a base, which may be made of a suitable material (e.g., metal, ceramic, glass or the like) for heating by conventional cooking devices (e.g., by placing the pan 2 over a gas or electric burner). The pan 2 is provided with one or more legs 4 arranged to allow the pan to rest on a flat surface 6 (e.g., during or after cooking), while causing the base of the pan to be angled relative to the flat surface such that one pan end 2b is lower in elevation than the opposite pan end 2a. An aperture or slit 8 is provided in the lower pan end.

In operation, a meat or meat product such as raw ground hamburger is placed into the pan 2 before cooking. The pan 2 is heated by conventional means to cook the meat. As discussed above, the cooked meat forms a liquid phase. Since the meat bed depth is small, the liquid phase easily drains from the cooked meat toward the lower pan end 2a, out the slit 8 and into a collection container 9.

Since the slit is about 3/32 inch in width, it is sufficiently narrow to prevent both raw and cooked meat from entering and plugging it. Further, since agitation of the meat is done manually (see Examples 1 and 2) there is insufficient force to push the pliable raw meat into the draining slit 8 (as is the case in industrial scale cookers). As a consequence, the draining slit 8 remains open during the draining period.

Although this apparatus can successfully drain fat from cooked ground meat, the apparatus design is typically limited to use with small quantities of meat, i.e., 10 to 20 lbs or less.

Figure 2A:
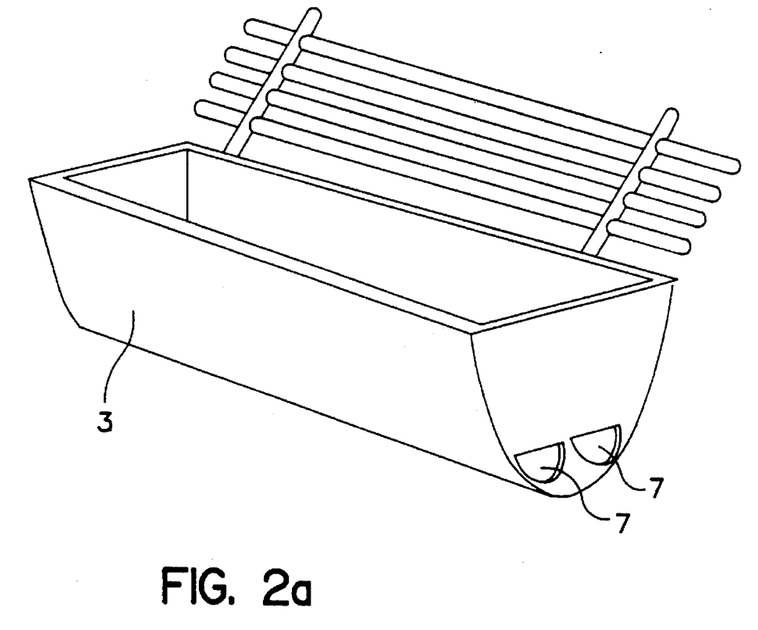
FIG. 2a is a perspective view of a prior art industrial meat cooker.
Figure 2B:
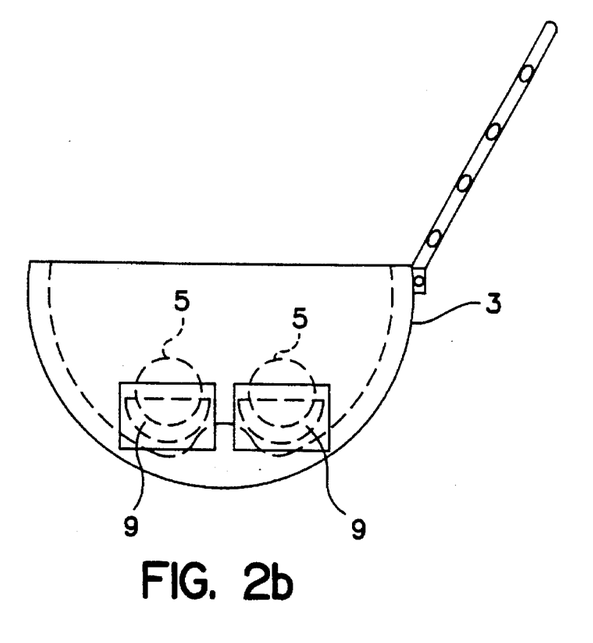
Figure 2C:
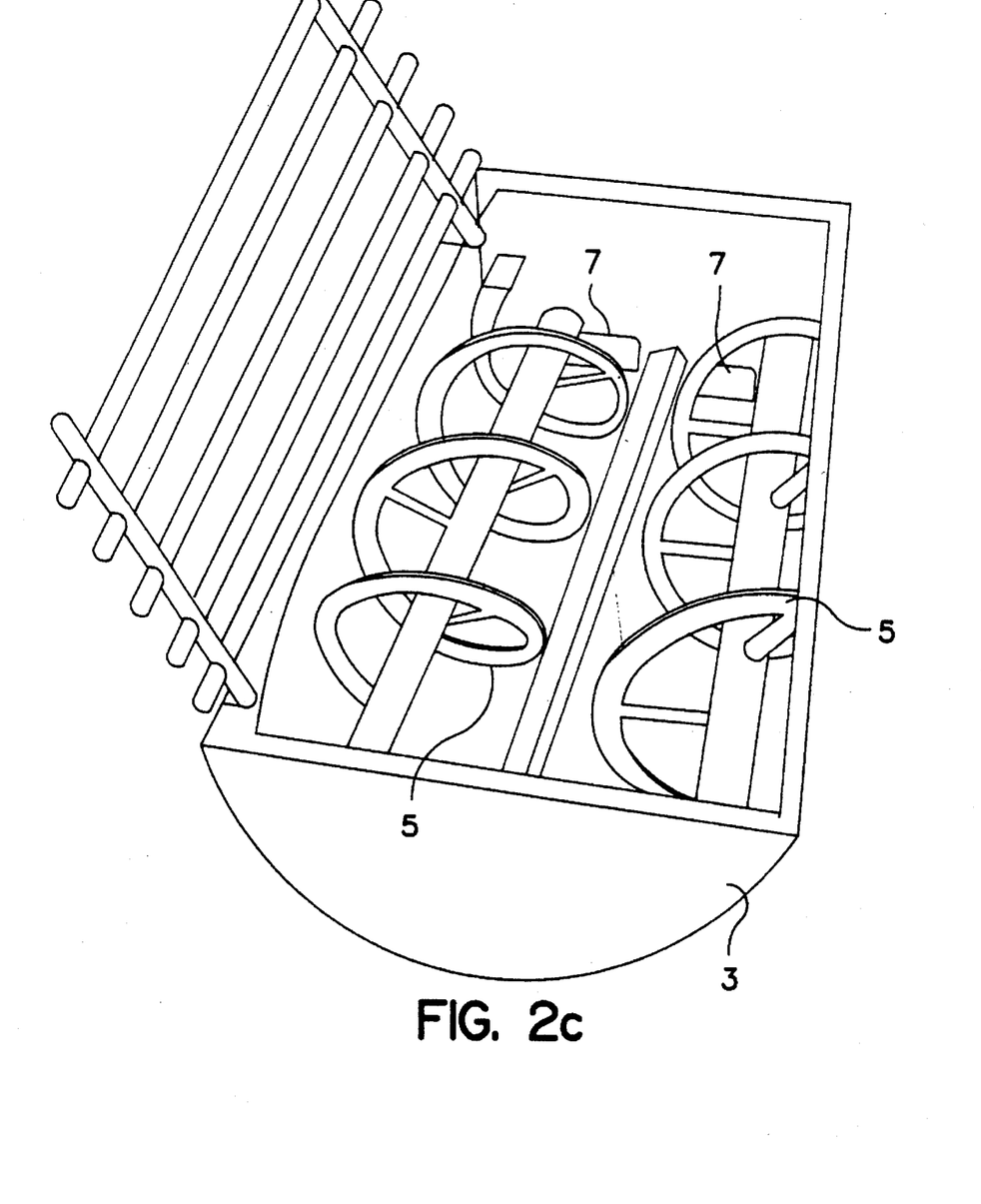

However, as discussed above, various conventional industrial meat cookers are capable of cooking relatively large volumes of ground meat, e.g., 500 lbs or more. FIGS. 2a–2c illustrate an example structure of one type of conventional industrial meat cooker. In the meat cooker of FIGS. 2a–2c, meat is cooked in a vat 3 which has an elongated dimension arranged generally horizontal. A safety grid cover and a domed cover (not shown) may be pivotally coupled adjacent the top of the vat. A typical cooking vat 3 is a Blentech Versatherm Model TP-28133 (manufactured by Blentech Corp. Rohnert Park, Calif.).

Meat is placed in the vat 3 and is churned during cooking by one or more agitators or mixers which, in the illustrated apparatus, include a pair of rotary ribbon-shaped blades 5. The walls of the vat are heated to cook the meat within the vat interior. Heating may be accomplished by steam or other means (not shown) which are well known in the art.

Under normal operating procedure, once the meat is cooked, the meat is removed from the vat 3 through openings 7 in the cooking vat wall. During the cooking process, the openings 7 are covered by plate-like, hydraulically operated doors 9 (so as to inhibit the meat from passing through the apertures). The doors 9 are opened by conventional hydraulic devices (not shown) when cooked meat is to be removed from the vat 3. However, when the meat is removed from the vat, it is mixed with fat and other liquid in the meat.

Prior to the present invention, deep, large volume cooking vessels, such as the vat 3, were not particularly suited for removing fat from cooked meat as evidenced, for example by the Hunt U.S. Pat. No. 3,949,659. Preferred embodiments of the instant invention addresses this problem by providing a draining system which can be readily added to existing meat cookers or for incorporating in the manufacture of meat cooking and draining systems.

Figure 3:
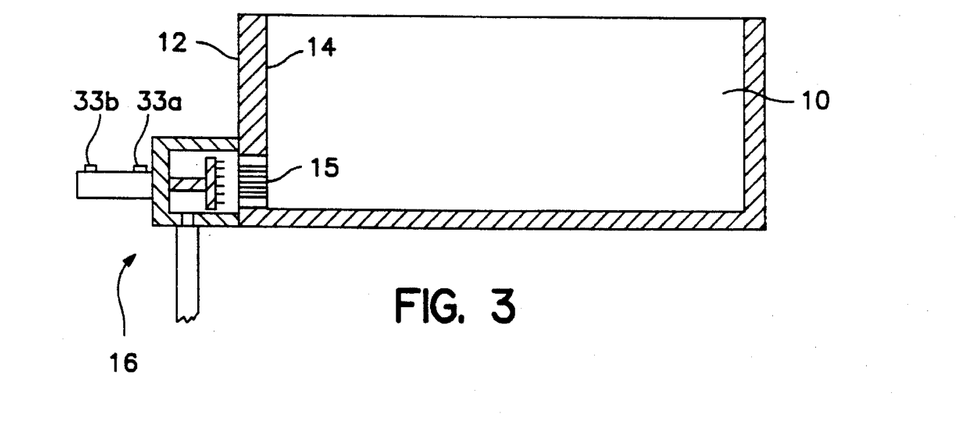
FIG. 3 is a cross section view of a meat cooker with a liquid phase draining system according to a preferred embodiment of the present invention.

FIG. 3 depicts a cross section of a system according to one embodiment of the present invention. In FIG. 3, the general cross-section outline of a cooking container 10 is shown. The container 10 may be, for example, a cooking vessel, such as a vat 3 of the structure shown in FIGS. 2a–2c or other suitable cooking vessel.

The container 10 comprises a container housing wall defining an exterior surface 12, an interior surface 14 and a pair of openings 15 (only one of which is in view in FIG. 3) through the container wall. Further embodiments may have more or fewer openings of various suitable shapes and sizes. In the preferred embodiment, the container 10 holds at least one agitator or mixer.

In a preferred embodiment, a food product (such as ground meat) is placed in the container 10 and cooked. As discussed above, the cooking process produces a liquid phase in the meat such that a mixture of cooked meat, liquified fat or tallow, and broth results in the container 10. However, unlike the apparatus shown in FIGS. 2a–2c, the apparatus in FIG. 3 further comprises a draining system for removing the liquid phase from the cooked meat.

Figure 4:
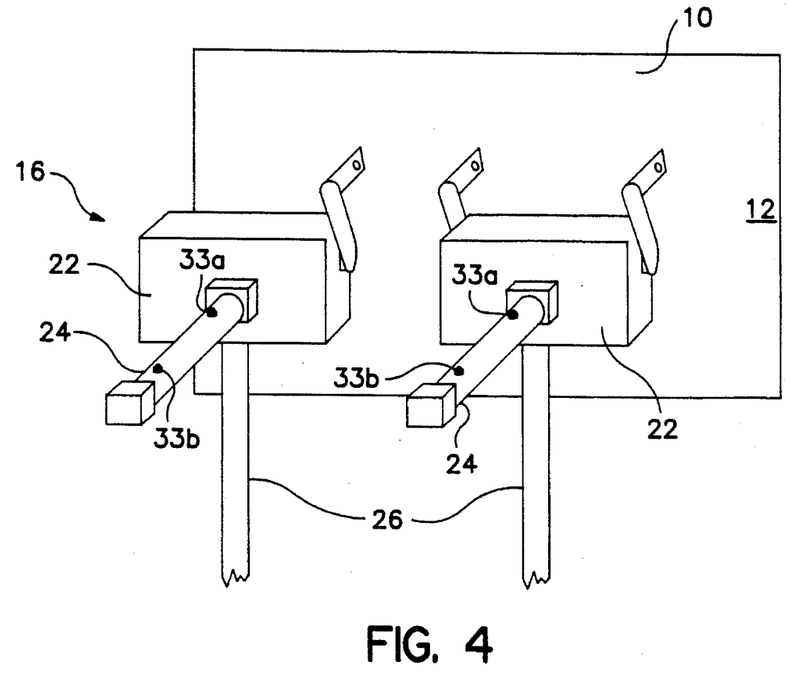
FIG. 4 is rear perspective view of a pair of draining boxes according to a preferred embodiment of the present invention.
Figure 5A:
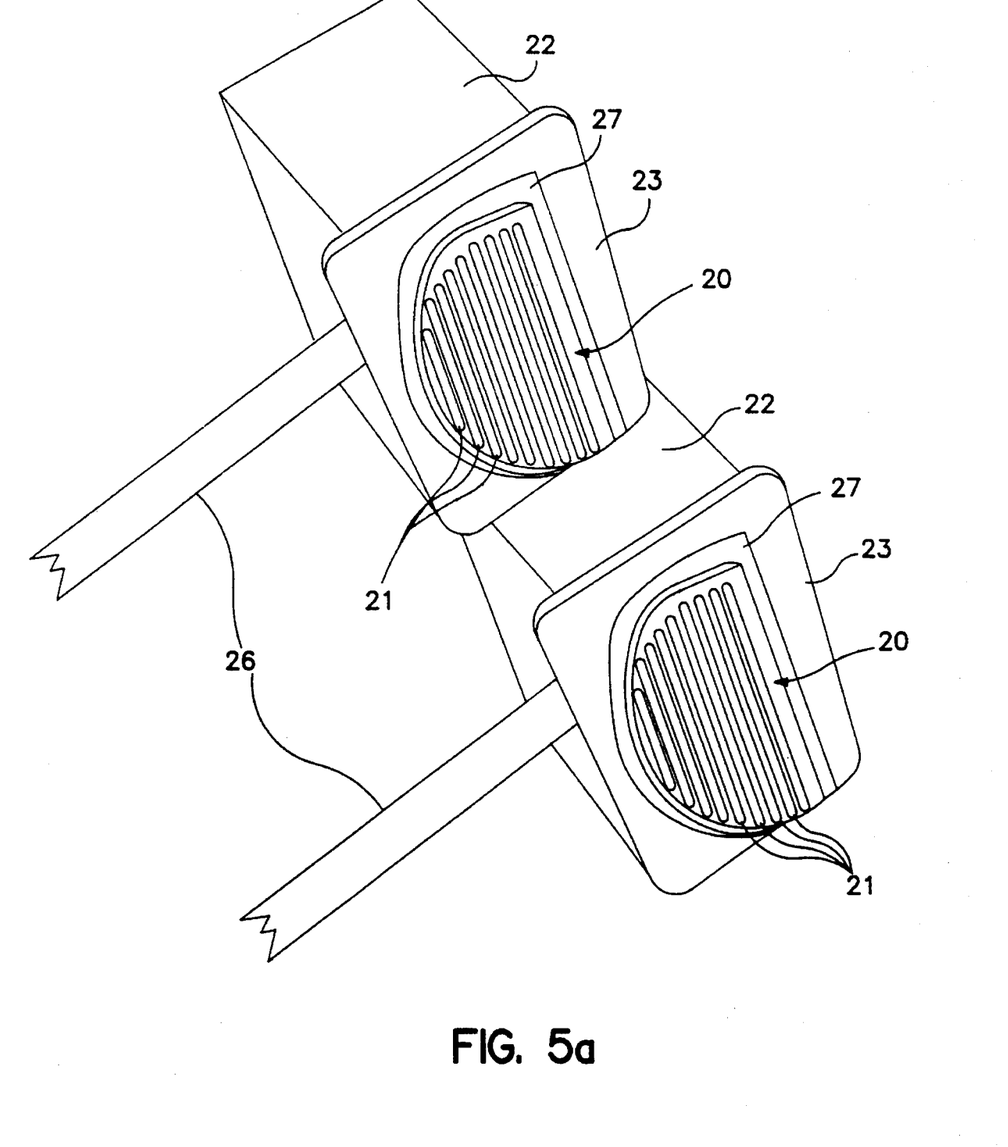
FIG. 5a is a front perspective view of the pair of draining boxes of FIG. 4.
Figure 5B:
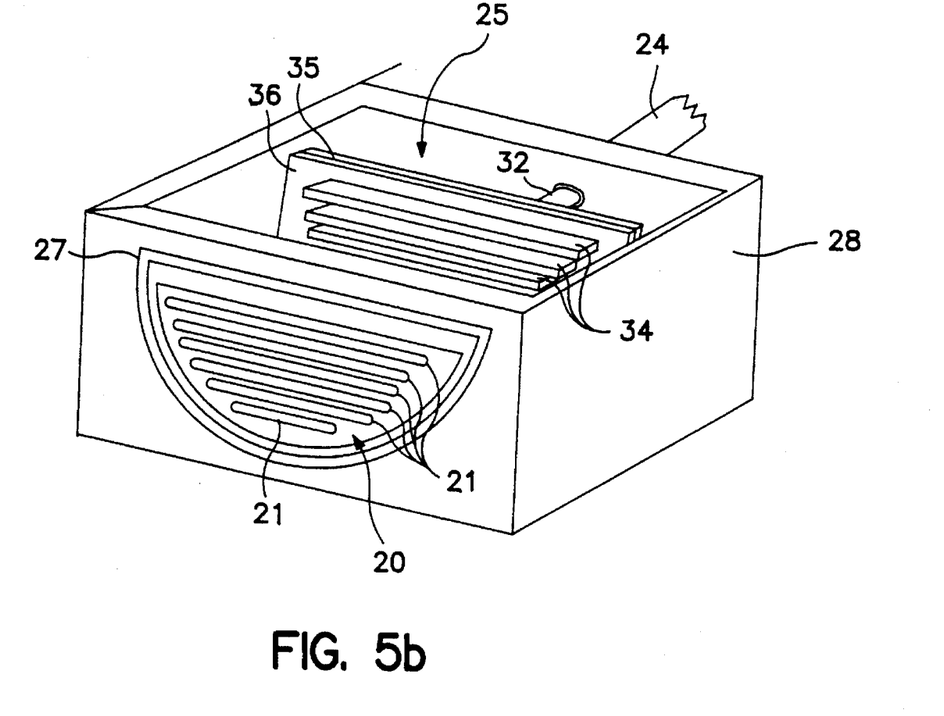
FIG. 5b is a top perspective view of a draining box of FIG. 4.
Figure 5C:
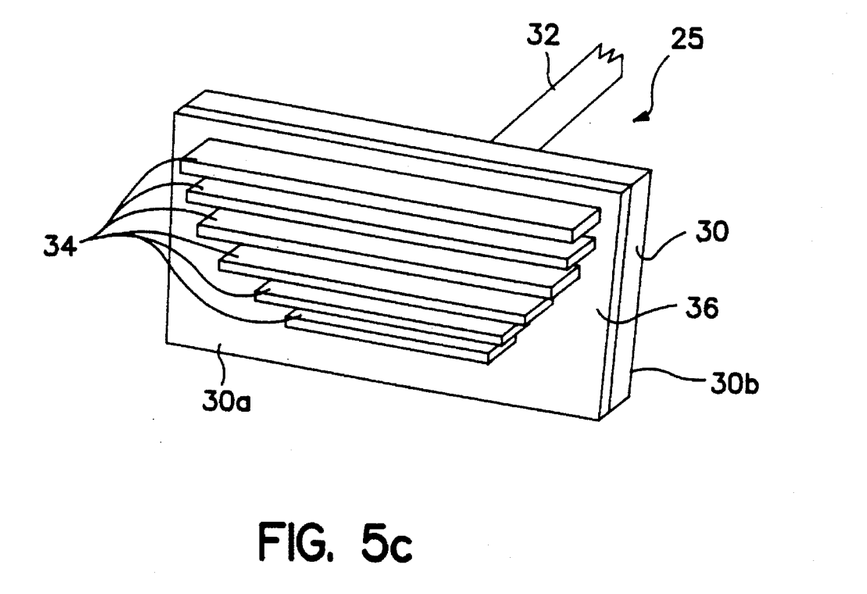
FIG. 5c is a perspective view of a plate and arm component of a draining box of FIG. 4.

The illustrated draining system 16 comprises two generally rectangular draining boxes 22 corresponding to two generally rectangular openings 15 in the container wall. However, other embodiments may employ other suitable numbers and sizes of draining boxes 22 and openings 15. As can be seen in FIGS. 3–5, each drainage box has a generally hollow interior and an end wall 23 provided with a slot array 20. The slot array 20 defines a plurality of narrow, elongated apertures 21, opening into and in flow communication with the drainage box interior. Other arrangements may employ apertures of other suitable configurations, such as round or polygonal apertures, curved or wavy shaped openings or the like. However, the openings of the apertures are to be large enough to pass liquid phase therethrough, but inhibit the passage of solid meat therethrough.

Figure 6:
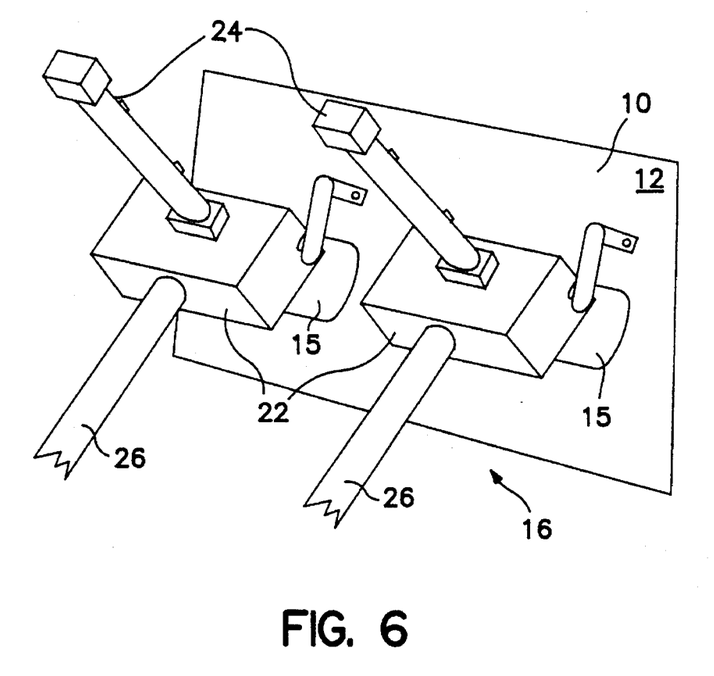
FIG. 6 is a perspective view of the pair of draining boxes of FIG. 4, in an open position.

Each draining box 22 has an elongated controller element 24 which controls the position of a movable plate and arm component (generally shown at 25 in FIGS. 5b and 5c) disposed within the draining box. Each drainage box 22 is pivotally coupled to the exterior surface 12 of the container 10 by suitable pivotal brackets 28 and a drive mechanism (not shown). The brackets 28 and drive mechanism allow the drainage boxes 22 to pivot between closed positions (shown in FIG. 4) and open positions (shown in FIG. 6). In the closed position, the end wall 23 of each drainage box faces and abuts the surface 12 of the container 10 and covers an aperture 15. In the open position, the end wall 23 of each drainage box is pivoted away from the container surface 12, so as to open the otherwise covered aperture 15, e.g., to allow the cooked meat to be readily removed from the container interior.

Each drainage box 22 also has a drainage tube 26 having one end coupled in flow communication with the interior of the drainage box. The other end of each tube 26 may be coupled to a suitable liquid phase collection container or disposal system.

As discussed above, disposed within each draining box 22 is a moveable plate and arm component 25. The plate and arm component 25 comprises a plate 30 having a front surface 30a and a rear surface 30b. An arm 32 extends from the rear surface 30b of the plate 30. The plate 30 supports a plurality of elongated protrusions 34. The protrusions 34 are configured and positioned to coincide and fit within the slots in the draining slot array 20 of the associated draining box, when the plate and arm component 25 is moved into a slot closing position.

The plate and arm component 25 is mounted within an associated draining box 22 for movement between a first position (wherein the plate 30 and protrusions 34 are separated from the slot array 20 and slots 21, as shown in FIG. 5b) and a second position (wherein the plate 30 is moved toward the slot array 20 such that the protrusions 34 are fitted within and substantially fill the slots 21. When in the first position, liquid may pass through the slot array 20 into the interior of the draining box. However, the size of the slot openings inhibits the passage of solid meat particulates into the interior of the draining box. When in the second position, both solid meat particulates and liquid are inhibited from passing through the slot openings.

Movement of the plate and arm component 25 is controlled by the controller element 24, which may be any suitable mechanism for selectively moving an arm (such as arm 32) in the direction of the arm axis. For example, suitable hydraulically operated mechanisms are known for providing such controlled linear movement. Thus, by way of example, FIGS. 3, 4, 5b and 6 show controller element 24 as a hydraulic cylinder within which the arm 32 is movably disposed. Hydraulic couplers 33a and 33b are provided for coupling to a suitable hydraulic pressure source, such that pressure supplied to coupler 33a will cause the plate and arm component 25 to move toward the first position and pressure supplied to coupler 33b will cause the plate and arm component 25 to move toward the second position. Suitable alternatives to the moveable plate and arm component and hydraulic controller include, but are not limited to, electronic/mechanical switches or a timer mechanisms controlling movable slots.

In the preferred embodiment, a seal 36 (such as a rubber gasket or the like) is disposed on the plate 30. When the plate and arm component 25 is moved into the second position, the seal 36 resides between the plate 30 and the draining slot array 20 for additional sealing functions.

The draining boxes 22 may be made from any material (including, but not limited to, ceramics, plastics, metals, such as, aluminum, copper or metal alloys such as stainless steel) that is suitable for holding liquids, including hot liquids and suitable for contacting food. Further, the draining boxes can be of various sizes and in any various quantities or locations on the container 10.

FIG. 5a depicts one embodiment of draining slot arrays 20. The draining slot arrays 20 each have a plurality of slot openings 21 defining a grating. When the draining box is provided in the closed position (FIG. 4) and the slots 21 are open (i.e., the plate and arm mechanism is not in the second position), the open draining slots 21 provide a liquid flow passage from the interior of the container 10 to the interior of the draining box and to the drain tube 26. A gasket 27 may be provided around each slot array 20 to improve the seal between the draining boxes 22 and the surface 12 of the container 10.

As discussed above, preferably the openings defined by the slots 21 are of a size which will inhibit the passage of solid meat therethrough. It is preferable that the width W of the openings of the draining slots 20 be no greater than about $3/32$" as cooked meat particles are generally greater than $1/8$" in diameter. Also as discussed above, the draining openings can be any shape that is suitable to allow fat and broth to pass, but generally prohibit the passage of meat. The shapes of the protrusions 34 will be appropriately matched.

The fat removal apparatus according to embodiments of the present invention may be implemented by modifying existing cooking systems. For example, components can be added onto an existing cooking system, or by manufacturing cooking systems with draining features as described herein. For example, the system shown in FIGS. 2a–2c may be readily modified by replacing the plate-like panels 9 with pivotal draining boxes 22 as described above. As a result, minimum modifications to the structure and operating process are necessary to convert the meat cooker of FIG. 2a–2c into a system for producing low fat cooked meat. However, it will be understood that further embodiments of the present invention may be employed with other types of conventional cookers to implement the desired cooking and draining system. Yet further embodiments comprise meat cookers specifically designed with draining apertures that allow liquid to pass, but do not allow cooked meat to pass and which are provided with mechanisms for selectively opening and closing such apertures.

Clearly, whereas the preferred embodiment of the current invention refers to a movable plate and arm mechanism with protrusions designed to block the draining opening at specific periods during the cooking operation, it is to be understood that alternative blocking mechanisms, such as sliding gate type plates etc. would also be effective in providing the blocking action.

The method for extracting fat according to the present invention includes the step of cooking ground meat at a temperature sufficient to cause fat in the ground meat to liquify, and a step of extracting the liquid phase from the cooked meat by draining the liquid phase from the meat through the drainage aperture (or array of apertures) which are too small to allow the passage of solid meat.

Figure 7:
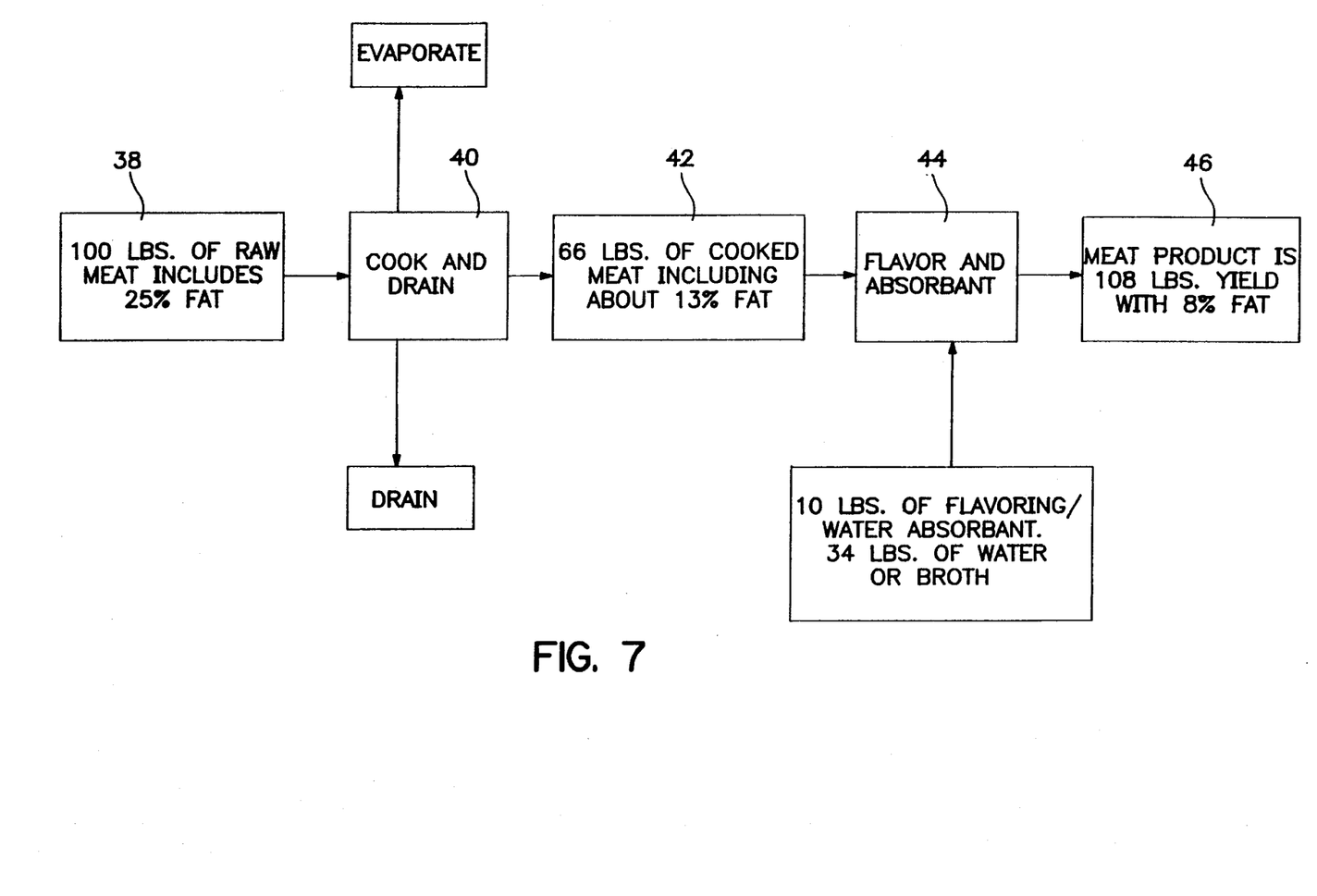
FIG. 7 is a schematic diagram illustrating steps of a process according to an embodiment of the present invention.

In a further embodiment, there is an additional step of adding a water absorbent and water or broth to the cooked meat such that the yield of the meat product obtained from the process is increased. FIG. 7 schematically illustrates an example of the above described process. In box 38 of FIG. 7, an initial volume of a food product (described herein for convenience as 100 lbs of ground meat having about 25% fat by weight) is provided. The initial volume is cooked and resulting liquid phase is drained (box 40). During cooking about 13 to 16 lbs. of fat and about 10 to 12 lbs. of broth are separated from the cooked ground meat. The cooking and removing of liquid phase provides about 66 lbs of meat having about 13% by weight of fat (box 42). In box 44, water absorbent, water or broth and flavoring are added to the 66 lbs of cooked meat. The water to flavoring/water absorbent ratio used is preferably about 3.4 lbs water per lb of flavoring/water absorbent; and about 10 lbs. of flavoring/ water absorbent is used per 100 lbs. of raw meat. Box 46 shows that the process produced about 108 lbs of cooked meat product having about 8% fat by weight.

The initial food product (box 38) used for cooking can contain any suitable percentage of fat content, including, but not limited to, up to about 30% by weight fat as allowed by the USDA. Indeed, the higher the initial fat content, the more economical the process becomes, as the cost of the raw meat used is typically less expensive the higher the fat content.

The process step of cooking the ground meat produces a liquid phase consisting of liquified tallow, or fat, and water-based broth. The liquid phase is separated from the meat as illustrated in box 40. Various methods of separating liquid phase from meat are described in co-pending applications entitled METHOD AND APPARATUS TO PRODUCE LOW FAT GROUND MEAT (Attorney Docket Number PD-3365) which is incorporated herein by reference.

In particular, with reference to the above-described apparatus, in one preferred embodiment of the draining process, the draining slots 20 are closed during the cooking stage of the meat preparation process. Further, the meat product is agitated by mixers 16 or some other appropriate means during the cooking process to allow the meat mass to evenly cook.

At a suitable time during or after the cooking stage (for example, when the raw meat is sufficiently cooked), the draining slots 20 are opened, allowing the liquid phase produced during the cooking stage to drain by gravity through the draining slots 20. The liquid collects in the draining box 22 and then passes around and under the plate 30 and into the draining tubes 26 to an appropriate disposal or collection site.

Preferably, the separation of the liquid phase results in cooked ground meat that contains approximately 10–13% by weight fat content, which may also be about 60–75% by weight of the initial volume of raw meat. The resulting fat content is essentially the same irrespective of the percentage of fat content in the initial raw ground meat. However, in general, the higher the fat content of the starting meat, the greater the amount of fat produced in the liquid phase and the lower the yield of cooked meat illustrated in box 34 of FIG. 7 (see Example 1 below).

In particular, the cooking and separation steps cause the bulk content of the initial meat to decrease such that only 60–75% by weight of the initial bulk weight of the raw ground meat remains after cooking and liquid phase separation. To increase and replace bulk content of the meat product, a water absorbent is added to the low-fat, cooked, ground meat. In one embodiment, the water absorbent is a solid, fibrous material added to the meat in a dry or semi-dry form. The water absorbent and meat are mixed with water and/or broth that have been either added to the meat mixture or remain in the mixture.

The water absorbent can be any suitable product capable of absorbing sufficient quantities of water or broth. It is preferable that the water absorbent is solid to enhance the "chunkiness" of the meat product. A "chunky" texture is preferred for certain meat products, such as meat products used as taco meat products. Further, it is preferable that the water absorbent be a natural food, such as for example, but not limited to, oat flakes, oat fiber, wheat fiber etc.

In addition to the water absorbent, a flavoring such as a taco flavoring is generally added to the meat. In one embodiment of the present invention, the addition of a water absorbent and flavoring not only flavors the meat, but increases the yield of meat to about 108% of the bulk weight of the initial meat. This results in a gain of the yield of meat product from the initial meat weight. In addition, because flavoring is added after the cooking and fat removal steps, flavoring is not lost during cooking or fat removal. Further still, the addition of water absorbent and water increases the product yield without adding fat and, thus, further diminishes the percentage of fat in the overall product. Accordingly, the addition of water absorbent can affect a further reduction in the percentage of fat in the overall meat product to about 4.5–8.0% by weight.

Due to the ability of the absorbent to absorb relatively large amounts of water relative to the unit weight of the absorbent, only a relatively small quantity of absorbent is required, for example, approximately 5% of the weight of the initial ground meat. The use of a small amount of absorbent minimizes any negative impact the water absorbent may otherwise have on product taste. Further, the use of a small amount of absorbent helps keep the cost of the process low.

The present invention allows the use of meats with a variety of initial fat contents, including relatively high-fat meat with a relatively high initial percentage of fat, such as 25–30% by weight, to produce generally low-fat meat products (4.5–8.0% by weight of fat). Further, combining a fat separation step with a flavoring or yield enhancing step produces relatively high yields of relatively low-fat meat products. In the preferred embodiment, a small amount of natural food absorbing material is used to absorb significant quantities of water, yet maintain a "chunky" meat-like texture.

For purposes of illustrating various principals and features of the invention, the following Examples are described below, but are not intended to limit the scope of the invention.

EXAMPLE 1

Experiments were undertaken to determine the fat content and yield of cooked ground meat remaining after efficient removal of the liquid phase produced during cooking by the method and apparatus of this invention.

The meat for these experiments was cooked in an open aluminum pan approximately 17 inches wide by 20 inches long, constructed with approximately 4 inch high side walls surrounding the entire flat pan surface (similar to the one shown in FIG. 1).

A ³⁄₃₂ inch wide slit approximately 8 inches long was machined along the lower front edge of the pan at the intersection of the flat pan surface and the front side wall surface. The total open flow area of the slit was therefore 0.75 inches squared.

A small collection trough was attached to the underside of the pan in the location of the slit. This trough was designed to collect the liquid passing out of the pan through the above-mentioned slit, and to convey the exiting liquid through a flexible tube to an external collection vessel where the volume of exiting liquid could be measured.

The modified cooking pan was placed on a commercial gas-fired kitchen stove and the edge of the pan opposite from the slit was elevated above the level of the slit edge. In this manner, liquid fat and broth produced during the cooking of ground meat in the pan flowed toward the slit opening and exit the pan thereby being separated from the cooking meat. Prior experiments had demonstrated that a ³⁄₃₂ inch slit was sufficiently small to prevent plugging by raw or cooked meat particles, but sufficiently large not to impede the flow of liquid through the slit.

Several experiments, using ground meat of different fat content, were performed using this cooking pan and liquid separation device. In all cases, approximately 10 lbs. of ground meat was placed in the pan and cooked on the gas flame stove, with continuous manual agitation by a rake-like device to assure uniform cooking.

A 10 lb. batch of meat generally took approximately 15 minutes to cook to a temperature greater than 165° F. After about 7 to 8 minutes into the cooking cycle, liquid broth and fat started to drain out through the slit and was continuously collected in the measuring vessel. Liquid fat and broth continued to drain from the meat for an additional approximately 3 minutes, even after the cooking process was terminated.

Once the liquid essentially stopped draining from the pan, the volume of fat (which floated on the broth) and the volume of broth were noted.

TABLE 2

SUMMARY OF FAT SEPARATION STUDIES UTILIZING
GROUND MEAT WITH DIFFERENT FAT CONTENTS

| | RAW MEAT | | DRAINED LIQUID | | COOKED MEAT | | GMS FAT PER 100 |
|---|---|---|---|---|---|---|---|
| RUN NO. | STARTING WT. GMS | % FAT | FAT MI | BROTH MI | YIELD %* | % FAT | GMS OF RAW MEAT USED IN COOKING** |
| 1. | 4550 | 24.24 | 775 | 465 | 65 | 12.28 | 7.98 |
| 2. | 4562 | 20.0 | 667 | 577 | 67 | 12.06 | 8.09 |
| 3. | 4559 | 13.21 | 215 | 635 | 73 | 10.14 | 7.39 |
| 4. | 4562 | 11.19 | 145 | 590 | 76 | 11.08 | 8.39 |

*% Yield = [Cooked meat weight after draining/starting raw meat weight] × 100

**gms fat/100 gm starting raw meat used in cooking = $\frac{\% \text{ Yield} \times \text{Cooked Meat \% fat}}{100}$ Table 2 presents the results of four fat separation experimental runs using raw meats of different starting percent fat content. For each experimental run, Table 2 indicates the initial weight and fat content of the raw meat used. The Table then summarizes the quantity of fat and broth drained from the cooked meat and the yield and fat content of the cooked meat produced in each of the particular experimental runs. The grams of fat remaining in the cooked meat per 100 grams of raw meat cooked was then derived from the cooked meat yield and fat content.

Figure 8:
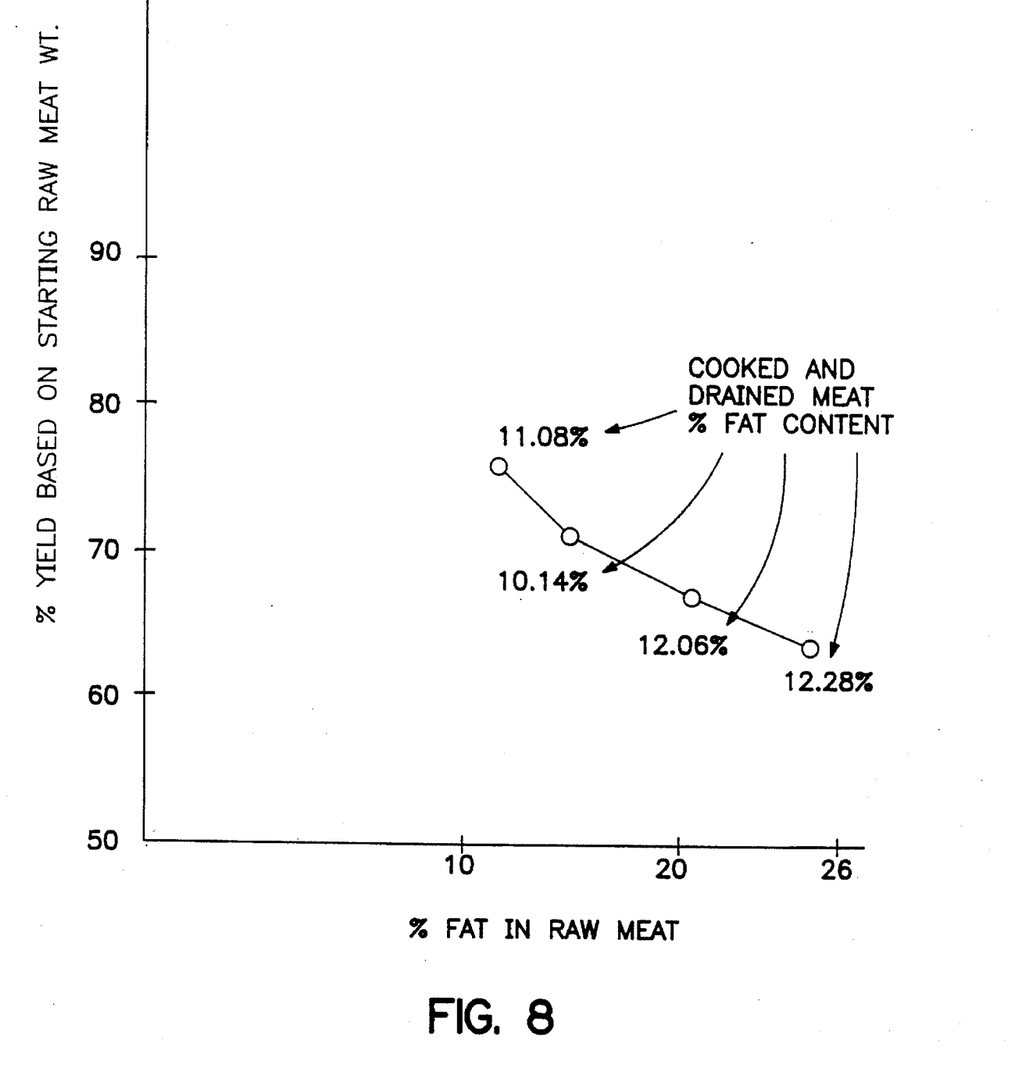
FIG. 8 is a graph showing a plot of cooked meat yield vs. initial percent fat in the starting raw meat.
Figure 9:
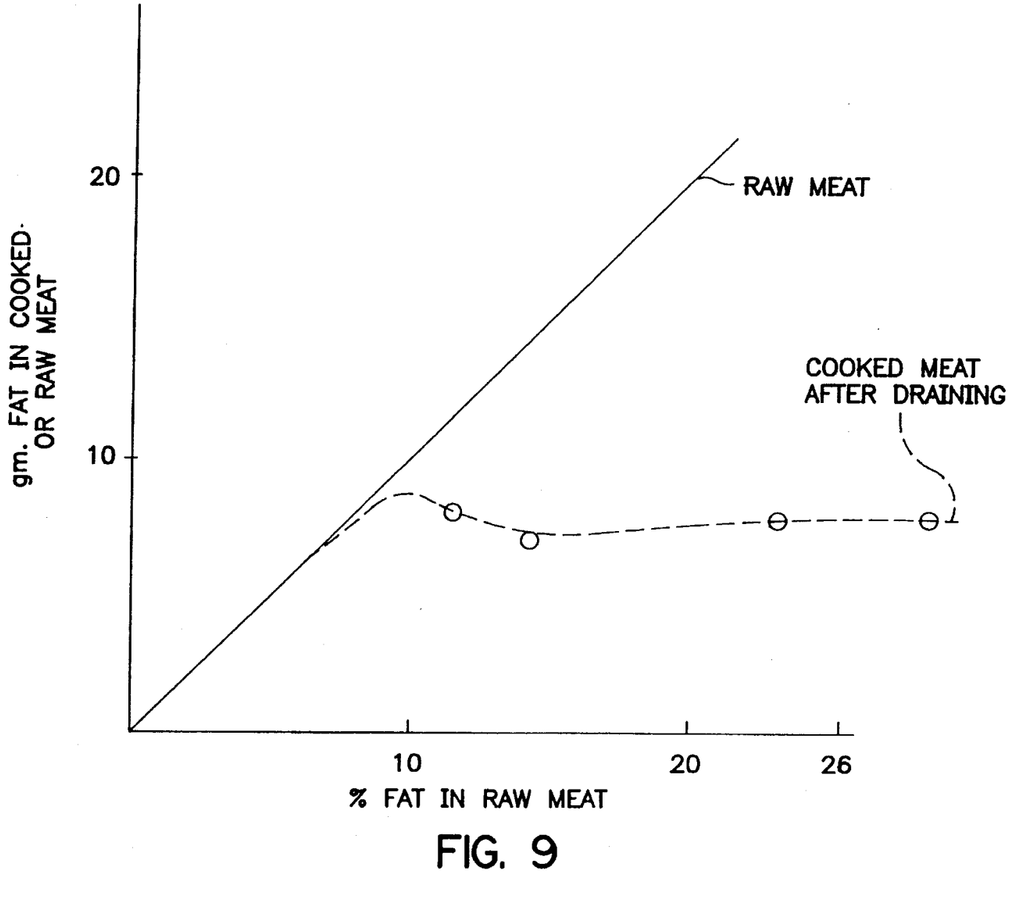
FIG. 9 is a graph showing a plot of the fat content (in grams of fat) for either raw meat or cooked meat after liquid separation against the percent fat in the raw meat used to produce the cooked and drained meat

FIGS. 8 and 9 present the data of Table 2 in graphical form. FIG. 8 is a plot of cooked meat yield vs. percent initial percent fat in the starting raw meat. For each different starting raw meat, FIG. 8 also presents the final cooked and drained meat percent fat content.

FIG. 9 plots the fat content (in grams of fat) for either raw meat or cooked meat after liquid separation against the percent fat in the raw meat used to produce the cooked and drained meat.

From these experiments one can see that:

1. Low fat ground meat (with a fat % ranging from 10% by weight to 12% by weight) can be produced from almost any percent fat starting raw ground meat, provided that the rendered fat can be separated from the cooked mixture. (FIG. 8)
2. The low fat ground meat remaining after separation of the liquid phase contains about 8 gms. of fat for every 100 gms of raw ground meat cooked, irrespective of the fat percent of the raw meat. (FIG. 9)
3. The yield of low fat ground meat remaining after separation of the liquid ranges from 65% to 75%, and is lower the higher the fat content of starting raw meat. (FIG. 8)

EXAMPLE 2

Raw ground beef having an initial weight of 4540 grams and an initial fat concentration of approximately 25% by weight was selected as a starting (or initial) ingredient. The raw meat was placed in a cooking pan with draining slot of the type as described with reference to FIG. 1. The meat was cooked over a gas flame stove for 14 minutes, at which time the cooked meat had reached a temperature in excess of 170 degrees F., as measured by an electronic thermometer.

After about 5 to 7 minutes, a liquid phase of fat and broth started exiting from the pan through the slot. This liquid was collected for an additional 3 minutes after the gas cooking flame had been extinguished. A total of 635 ml. of fat and 540 ml. of water based broth were collected from the draining system.

It was determined that a 3/32 inch slot representing a draining open area of 0.075 inches squared per pound of raw meat processed permits continuous and rapid draining of "kitchen scale" cookers.

A seasoning/water absorber mixture was prepared for addition to the cooked and drained meat. In order to prepare the seasoning/water absorber, 457 gms. of seasoning/water absorber was mixed with 1550 gms. of room temperature water to produce a liquidy paste. Here, the seasoning was a "taco" flavor and the water absorber was a mixture of oat flakes and oat fiber. This "paste" was added slowly to the low fat ground meat in the cooking pan while continuously mixing the cooked ground meat/paste mixture over a reduced heat gas flame until the temperature of the entire mixture once again exceeded 170° F. During this mixing/heating period, the meat was seasoned and the water absorbent absorbed the excess water and was distributed throughout the meat.

As a result, 4977 gms of flavored meat having a fat content of 7.25% by weight fat was produced. This represents a 109.6% yield (based on starting raw meat weight).

EXAMPLE 3

The discharge doors on a Blentech Model 1548 VersaTherm blending cooker (similar in construction to the cooker shown in FIGS. 2a–2c) were modified and fitted with a slotted draining system with slot "plugs" (similar in construction to the draining box system described above with reference to FIGS. 3–6) according to the present invention. The total open flow area of the slots in the above-mentioned system was approximately 16 inches squared.

The discharge doors and slots were closed and 455 lbs of ground beef having an initial fat concentration of approximately 25% by weight was loaded into the cooker.

The meat was cooked conventionally with continual agitation by blending agitators utilizing 36 psi steam as the heating medium. The cooking step was terminated when the meat temperature reached 165° F. to 170° F., as measured manually by a long stem dial thermometer at several locations in the meat mixture.

With the blending agitators continuing to maintain the meat in a mixed state, the slot "plugs" were opened pneumatically and the fat/broth mixture allowed to drain out over a period of time. After 12 minutes of draining time, 60 liters of liquid (representing 72% of the total liquid volume that eventually drained) had already drained from the cooker. This liquid contained approximately 33 liters of fat.

As the liquid level in the meat mixture dropped, so did the rate of draining, so that a total of 35 minutes was required to drain essentially the entire liquid content of the meat bed. A total of 81 liters of liquid containing about 36 to 38 liters of fat was collected. Analysis of the remaining ground meat showed that it had a fat content of 13.87% by weight.

As indicated above, agitation of the meat bed was continued throughout the draining step. This was done to minimize compaction of the meat bed in the vicinity of the drainage slots, in order to ease the drainage rate through the meat bed. However, it was recognized that continued agitation during the draining phase tended to maintain the liquid/ground meat mixed which reduced the rate of draining. Consequently, a further experiment was undertaken in which the agitators were stopped shortly after the drainage "plugs" were opened, so as to assess the relative advantage of agitation during the draining process.

In preparation for a second experimental run, the drainage slots were closed and 453 lbs of the same meat as the previous run were placed and cooked in the Blentech cooker, according to the earlier procedure.

At the end of the cooking cycle, the slots were opened, and the agitators stopped. The entire draining process then proceeded without any agitation of the meat mixture. At the end of 12 minutes, 73 liters of liquid had drained from the meat (containing approximately 34 liters of fat) and once again, draining needed to continue for a total period of approximately 30 minutes during which a total of 26 liters of liquid drained out containing about 39 liters of fat. Both approaches were within the scope of the present invention.

Thus, under industrial conditions, a surprisingly small slot flow area of about 0.03 inches squared per pound of meat processed is sufficient to permit the liquid draining to be completed in about 30 minutes. Clearly, this draining time could be even further reduced, according to further embodiments, with additional draining systems installed at strategic locations along the bottom of the cooker (to provide additional drain flow area and to minimize the distance the liquid needs to flow to reach a drainage open area).

In a third experimental run, the drainage slots were left open. About 450 lbs. of similar meat to the previous runs were then cooked in the Blentech cooker, according to procedures described earlier.

Within a few minutes of commencing the cooking cycle a liquid mixture of liquified fat and broth started to exit the cooker through the open slots. However, the exiting liquid was mixed with raw meat which also contaminated and partially filled the open slots. Only about 10 liters of liquid was collected during the period in which the meat temperature increased to about 165° F. Once the meat temperature exceeded about 165° F., then the liquid flow rate increased and similar quantities of fat and broth were collected as indicated in the above two experiments. Red raw meat remained in the slots throughout the entire cooking and draining process both blocking and contaminating the slots. Since this raw meat was then in direct contact with the cooked meat in the cooker, it formed an unacceptable microbiological contamination risk, and as such precluded this operating approach. Further, during the period when the meat temperature was less than about 165° F., raw meat passed out of the cooker through the slots resulting in a further loss of meat.

Thus, it is possible to separate liquid fat from a cooking vessel containing a cooked meat/liquid mixture, provided drainage openings can be located on the lower walls of the cooking vessel, and the openings can be prevented from plugging and becoming contaminated with meat (raw or cooked). Agitation in beds that are less than 1 to 2 ft in depth is not essential but may be beneficial in deeper beds.

Although the foregoing describes preferred embodiments of the invention, the foregoing description is not intended to limit the invention. Rather, the foregoing is intended to cover all modifications and alternative constructions failing within the spirit and scope of the invention as expressed in the appended claims.

What is claimed is:

1. A draining system for removing liquified fat from a meat product, the system comprising:

a cooking vessel having a bottom wall and configured to retain a volume of meat product and liquified fat, the vessel further having at least one drainage opening adjacent the bottom wall;

a draining slot member disposed on said vessel adjacent each associated drainage opening and configured to allow liquified fat to pass therethrough, but to inhibit the passage of meat product therethrough;

means for selectively closing and opening each draining slot member, said means being movable from a first position wherein the slot member is closed, thereby preventing the slot member from being plugged with meat, to a second position wherein the slot member is open, thereby permitting liquified fat to readily flow therethrough; and at least one protrusion provided on each of said closing and opening means and arranged to fit within the draining slot member associated with the closing and opening means to substantially close the slot member upon the closing and opening means being moved into the first position.

2. The draining system as claimed in claim 1 wherein the cooking vessel is generally elongated with curved sidewalls.

3. The draining system as claimed in claim 1 wherein at least one drainage opening is disposed on the vessel along the bottom thereof.

4. The draining system as claimed in claim 1 wherein each draining slot member comprises a plurality of elongated apertures.

5. The draining system as claimed in claim 4 wherein each draining slot member is approximately 3/32 inches in width.

6. The draining system as claimed in claim 1 wherein said means for selectively closing and opening comprises a movable plate associated with each draining slot member and supported for movement between a first position at which the plate engages the associated draining slot member and a second position at which the plate is spaced from the associated draining slot member.

7. A draining system for removing liquified fat from a meat product, the system comprising:

a cooking vessel having a peripheral wall defining a vessel interior configured to retain a volume of meat product and liquified fat, wherein the peripheral wall has at least one drainage opening;

at least one drainage box movably joined to the cooking vessel and located adjacent each drainage opening, each drainage box having at least one drainage aperture in flow communication between the box and the drainage opening;

means for selectively closing and opening each drainage aperture, said means being moveable from a first position wherein the drainage aperture is closed, thereby preventing the drainage aperture from being plugged with meat, to a second position wherein the drainage aperture is opened, thereby permitting liquified fat to readily flow therethrough; and at least one protrusion provided on each of said closing and opening means and arranged to fit within and fill the drainage aperture associated with the closing and opening means to substantially close the aperture upon the closing and opening means being moved into the first position.

8. The draining system as claimed in claim 7 wherein said at least one draining aperture comprises an array of generally parallel, elongated slots, and wherein said means for selectively closing and opening comprises a moveable plate having a plurality of protrusions configured to fit within and fill the slots upon the plate being moved into said first position.

9. The draining system as claimed in claim 8 further comprising drive means for selectively moving the plate between said first position and said second position.

10. The draining system as claimed in claim 9 wherein said drive means comprises a pneumatic cylinder.

* * * * *